Jan. 28, 1969 — H. B. WARNER — 3,425,004

RADIO FREQUENCY ENERGY ATTENUATOR

Filed Nov. 29, 1963

INVENTOR.
HENRY B. WARNER
BY
Dock N. Jeu
AGENT

INVENTOR.
HENRY B. WARNER
BY
AGENT

INVENTOR.
HENRY B. WARNER
BY
AGENT

United States Patent Office 3,425,004
Patented Jan. 28, 1969

3,425,004
RADIO FREQUENCY ENERGY ATTENUATOR
Henry B. Warner, Westminster, Calif., assignor, by mesne assignments, to McDonnell Douglas Corporation, Santa Monica, Calif., a corporation of Maryland
Filed Nov. 29, 1963, Ser. No. 326,928
U.S. Cl. 333—79  6 Claims
Int. Cl. H01h 7/14; H01b 3/00

My invention relates generally to means for protecting electroexplosive devices from being inadvertently ignited and exploded by the pervasive electromagnetic fields of such sources as the powerful radar systems that may be located near the electroexplosive devices. More particularly, the invention relates to a radio frequency energy attenuator which can be inserted in the input leads directly before the input of a properly shielded electroexplosive device to attenuate any radio frequency energy that might be electrically induced in the input leads of the electroexplosive device.

On modern missiles and rockets, electroexplosive devices are often used as initiators of much larger charges of explosives or propellants. Since these missiles and rockets are invariably stored or launched from sites which utilize strong communications transmitters and very powerful radar systems for tracking and observing the launched missiles and rockets, as well as other vehicles, a hazardous condition exists which could cause the ignition of an unprotected electroexplosive device by the electromagnetic fields of the nearby strong transmitters and powerful radar systems in inducing a sufficiently high voltage in the input leads of the electroexplosive device to ignite or detonate the same.

In order to circumvent the possibility of accidental firing of the electroexplosive devices in missiles and rockets located and used in an extreme radio frequency environment produced by strong communications transmitters and very powerful radar systems or the like, it is desirable that any induced radio frequency energy conducted to the electroexplosive devices be attenuated by a large factor, such as 1/1,000,000 or 60 decibels, for example. The only known way to accomplish this prior to my invention was to build large and complicated filters into the initiators, in which the filters were appropriately designed and modified to serve as attenuators of a sort wherein the attenuation over a desired frequency range of, for example, 500 kc./s. to 10,000 mc./s. would be at least 60 decibels.

There is a danger in the use of such complicated filters in that, because of the likelihood of resonant conditions, it is possible that the filter impedance may be tuned out and attenuation may drop to a dangerous level if the filter is not carefully designed and tested throughout a wide frequency range. The large size of such filter-attenuators may also necessitate major redesign of the various missiles and rockets in order to accommodate them suitably. The weight and size of these large filter-attenuators further impose considerable weight and reliability penalities respectively on the carrying missiles and rockets and the systems involved.

It is an object of my invention to provide a very small and highly reliable attenuator which can be used to protect electroexplosive devices from being inadvertently ignited and detonated by the electromagnetic fields of powerful and nearby radar systems and the like.

Another object of the invention is to provide an attenuator for protecting electroexplosive devices over a wide frequency range, and which cannot be tuned out as might occur in conventional filter-attenuators.

A further object of the invention is to provide a lossy transmission line or cable in which various losses due to different effects are especially enhanced, and the line or cable can be used to form the principal part of a radio frequency energy attenuator.

A still further object of this invention is to provide a radio frequency energy attenuator which utilizes skin and proximity effects to advantage in effectively increasing the insertion loss due to the attenuator with increasing frequency.

Briefly, and in general terms, the foregoing and other objects are preferably accomplished by providing an attenuator including a lossy transmission line or cable which is designed and constructed to maximize various energy losses that increase with increasing frequency. The leads in the line or cable are constructed of selected material in a preferred shape and arrangement wherein the particularly fabricated leads are embedded in an appropriate dielectric material within a shielding sheath such that by virtue of skin and proximity effects, resistance of the leads is greatly increased with increasing frequency along with various losses including magnetic hysteresis losses, dielectric losses and eddy current losses. Different illustrative embodiments of the lossy transmission line or cable are compactly housed in a shielding container which can be directly connected to an electroexplosive device. The different embodiments of lossy transmission line or cable can be used either with or without lumped resistance, capacitance and/or inductance elements.

My invention will be more fully understood, and other features and advantages thereof will become apparent from the following detailed description of illustrative examples of the invention to be taken in conjunction with the accompanying drawings, in which.

Figure 1:
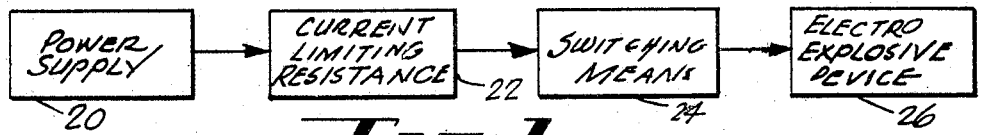
FIGURE 1 is a block diagram of a conventional system for energizing and firing an electroexplosive device.

FIGURE 1 is a block diagram of a system commonly used to energize and fire an electroexplosive device which, in turn, may be used to detonate a much larger explosive or propellant charge. A power supply 20 provides power through a current limiting resistance 22, when switching means 24 is closed, to an electroexplosive device 26 and fires the latter. The electroexplosive device 26 normally includes a bridgewire element (not shown) which may be suitably connected to the switching means 24. The bridgewire element passes through or is coated with a small amount of primer material which is in direct contact with a number of grams of explosive material. The primer material is relatively easily ignited by a current flowing through the bridgewire element and causes the explosion of the explosive material which, in turn, initiates a much larger explosive or propellant charge.

The electroexplosive device 26 is used for various purposes in modern missiles and rockets. Very often the electroexplosive device 26 is employed as an initiator to detonate or control very large explosive or propellant charges in these missiles and rockets. Of course, the missiles and rockets are almost invariably stored or launched from sites which utilize strong communications transmitters and/or very powerful radar systems for tracking and observing the launched missiles and rockets, as well as other craft. Thus, the missiles and rockets are located and used in an extreme radio frequency environment induced by the strong transmitters and very powerful radar systems.

The leads connecting the switching means 24 to the terminals of the electroexplosive device 26, when the switching means 24 is open, constitute an antenna which is connected to the electroexplosive device 26. The leads connecting with the terminals of the electroexplosive device 26 may be considered to be a dipole antenna in which voltages distributed along the length thereof are induced by the radio frequency fields of nearby strong communications transmitters and very powerful radar systems. If the dipole happened to be properly located and exposed to the strong radio frequency fields of the nearby radar or communication systems, a sufficiently high voltage may be induced in the dipole or leads connecting with the electroexplosive device 26 to initiate the same. Accordingly, severe hazards exist for missiles and rockets which are stored and used in areas wherein strong transmitters or powerful radar systems are in operation.

Figure 2:
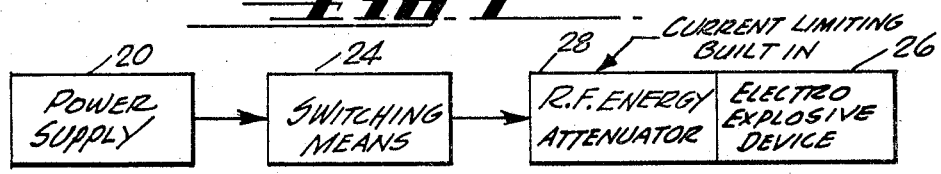
FIGURE 2 is a block diagram of a firing system incorporating a radio frequency energy attenuator according to my invention.

FIGURE 2 shows a block diagram of a system incorporating a radio frequency energy attenuator according to my invention, and which attenuator provides protection of an electroexplosive device from radio frequency fields due to, for example, strong transmitters and/or powerful radar systems. Power supply 20 is now connected, when the switching means 24 is closed, to radio frequency energy attenuator 28 and thence to the electroexplosive device 26 which is contiguously positioned at the output of the attenuator 28. The system shown in FIGURE 2 contains the same limiting resistance to direct current as does the system shown in FIGURE 1; however, this resistance is now inherently located in the attenuator 28.

The primary purpose of the radio frequency energy attenuator 28 in the illustrative application shown, is to provide protection to the electroexplosive device 26 from the radio frequency fields which are mainly due to powerful radar systems. This is accomplished by the attenuator 28 by attenuating all such radio frequency energy conducted in the system by a very large amount, and offering only a nominal resistance to direct current sources. The attenuator 28, therefore, must provide a certain minimum attenuation or insertion loss over a frequency range of, for example, 500 kc./s. to 10,000 mc./s. It is also necessary, of course, that the attenuator 28 furnish a minimum attenuation or insertion loss which cannot be tuned out as in common filter networks under certain resonant conditions.

Figure 3:
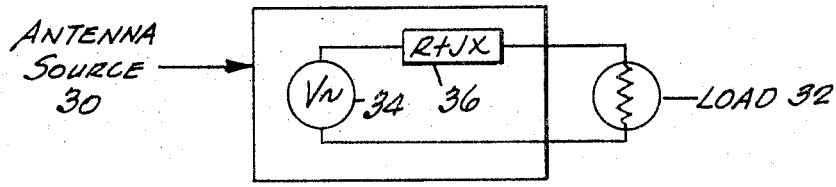
FIGURE 3 is a circuit diagram of an equivalent circuit representing an antenna source which is connected to a bridgewire element load of an electroexplosive device wherein the normal firing circuit undesirably acts as such an antenna source.

FIGURE 3 illustrates a representation of the leads connecting the switching means 24 to the electroexplosive device 26, as indicated in FIGURE 1, acting as an antenna source 30 supplying a load 32 which corresponds to the resistance of the bridgewire element of the electroexplosive device 26. The distributed voltages induced in the leads connecting the switching means 24 to the electroexplosive device 26, or more simply, in the antenna, cause currents to flow through the load 32. The antenna, insofar as the load 32 is concerned, can be considered to be a generator 34 having a voltage V equivalent to a summation of the distributed voltages, and an internal impedance 36. The internal impedance 36 is an equivalent antenna impedance that the load 32 sees locking into the antenna source 30.

The antenna impedance 36 comprises a resistive component R and reactive component X. The resistance component R consists of the radiation resistance of the antenna and some additional resistance due to other losses including those due to wire resistance, nearby ground and dielectrics, etc. The radiation resistance is essentially fixed by the length of the equivalent antenna circuit as measured in wavelengths. At low frequencies, the radiation resistance will be very small but it may be quite large at the higher frequencies.

The reactive component, however, cannot be as definitely established for the antenna because of the wide range of significant variables in component and circuit geometry which affect the characteristics of the distributed reactive constants of the antenna circuit. Thus, it is not ordinarily possible to be certain of the value of the reactance component X for broad band coverage. The simple expedients of adding large inductors, bypass capacitors, or other devices for radio frequency energy protection are undesirable because such means are subject to resonant effects and the reactance component X consequently might tune out the protective reactance at certain frequencies.

Accordingly, the attenuator 28 should be effective regardless of the reactance component X of the antenna source 30 if it is to be used to provide suitable protection of the electroexplosive device 26 over a broad frequency band. In order to ensure adequate protection of the electroexplosive device 26, the attenuator 28, in an illustrative firing circuit, should limit the power dissipated in the bridgewire element (load) of the electroexplosive device 26 so that relative to matched conditions of antenna and load, the power is reduced by a large factor, such as 1/1,000,000 or 60 decibels over the frequency range of 500 kc./s. to 10,000 mc./s., for example.

It is desirable that the attenuator 28 limit the power to the bridgewire element of the electroexplosive device 26 by the factor of 1/1,000,000 for matched conditions at any frequency over the desired range, and for all possible operative values of the impedance 36 of the antenna source 30. In the illustrative firing circuit mentioned above, the resistance component R of the impedance 36 is never greater than 2 ohms in radio frequency fields of frequencies less than 100 mc./s., for example.

Figure 4:
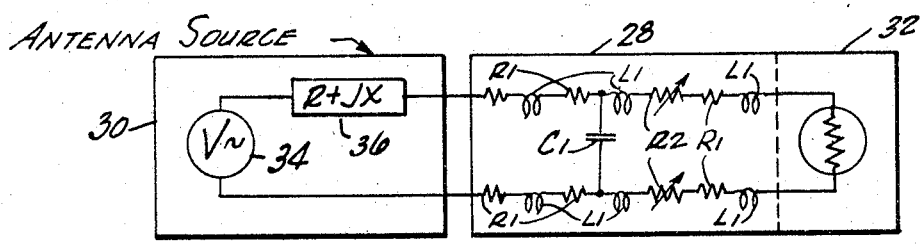
FIGURE 4 is a circuit diagram of an equivalent circuit representing the antenna source and a radio frequency attenuator connected to the bridgewire element load for attenuating the output of the antenna source, to reduce the radio frequency energy to the bridgewire element load.

FIGURE 4 illustrates the insertion of the attenuator 28 directly before the load 32 for protection thereof, and also shows a schematic or representative circuit of the attenuator 28. The attenuator 28 is a device which offers a much larger impedance to radio frequency current flow than to direct current flow. By replacing the current limiting resistance 22 (FIGURE 1) which has a relatively small resistance to current flow of all frequencies as well as to direct current, with a device which offers a much larger resistance to radio frequency current flow than to direct current flow, the total power or energy dissipated in the system is, of course, reduced. Thus, by virtue of the voltage division between the attenuator 28 and the bridgewire element of the load 32, only a small fraction of the total power dissipated would be dissipated in the bridgewire element.

As an example, let it be assumed that at a frequency of 10 mc./s. the resistance component R of the impedance 36 shown in FIGURES 3 and 4 is 2 ohms, and that the load 32 shown in these figures is also 2 ohms. The power consumed in the circuit of FIGURE 3 is $$P_1 = I^2 R_T = \frac{V^2}{R_T} = \frac{V^2}{4} \quad \text{(Eq. 1)}$$

The power consumed by the load 32 of FIGURE 3 would be $$P_{L1} = \frac{2}{2+2} P_1 = \frac{V^2}{8} \quad \text{(Eq. 2)}$$

Similarly, let it be assumed that at the frequency of 10 mc./s. the resistance of the attenuator 28 is, for example, 4000 ohms. Thus, the power consumed by the circuit of FIGURE 4 is $$P_2 = \frac{V^2}{2+4000+2} = \frac{V^2}{4004} \quad \text{(Eq. 3)}$$

The power consumed by the load 32 of FIGURE 4 would be $$P_{L2} = \frac{2}{4004} P_2 = \frac{V^2}{8,016,008} \quad \text{(Eq. 4)}$$

From Eqs. 1 and 3, $$\frac{P_1}{P_2} = \frac{4004}{4} = 1001; \ 30 \text{ decibels}$$

and from Eqs. 2 and 4, $$\frac{P_{L1}}{P_{L2}} = \frac{8,016,008}{8} = 1,002,001; \ 60 \text{ decibels}$$

The attenuator 28 according to my invention is a device which provides a frequency sensitive or variable resistance by virtue of the exploitation principally of the phenomena of skin effect in conductors. The scheme utilized is to maximize skin effects in balanced conductors which are constructed to eliminate all unwanted and undesirable coupling of the conductors with other elements or structure. The alternating current resistance of a wire is proportional to the square root of the frequency concerned, and the magnetic permeability and direct current resistivity of the wire material, or $$R_{AC} \propto \sqrt{fup} \quad \text{(Eq. 5)}$$

where $R_{AC}$ is the alternating current resistance,
$f$ is the frequency concerned,
$u$ is the magnetic permeability, and
$p$ is the direct current resistivity.

Thus, the attenuator 28 can be made of a cable or transmission line including a pair of closely spaced wires of a suitable resistivity and having a high magnetic permeability, or wires of a suitable resistivity and adequately coated with a material of high magnetic permeability. A cable or line of proper length will provide a limiting resistance which is frequency sensitive. Actually, such a cable or line having two wires which are spaced very close together has additional resistance due to proximity effects.

Such a cable or transmission line could be used as an attenuator by itself or with additional elements as schematically depicted in FIGURE 4 within the block representing the attenuator 28. As is well known, a transmission line may be represented as having distributed constants including distributed resistance, inductance and capacitance. The distributed resistance and inductance of the line are represented by resistors R1 and inductances L1, respectively. Resistors R2 are trimming resistors which were added to provide the proper and exact direct current resistance of the attenuator 28. Such trimming resistors are not usually required in most applications of the attenuator 28. The distributed capacitance is represented by and due to the spacing indicated between the balanced conductors. The conductors are preferably closely spaced for maximum capacitive coupling. By designing the line for maximum attenuation as well as skin effect, both mechanisms may be utilized to advantage for providing a lossy two wire transmission line in a suitable shield and which can be used for high attenuation of conducted radio frequency energy.

Skin effect, inductance and magnetic hysteresis losses of the conductors can be maximized by coating the conductors with a layer of high permeability material, for the lossy transmission line used in the attenuator 28. In addition to spacing the conductors closely together for maximum capacitive coupling, additional capacitance over and above the normal distributed capacitance can be added to the line in whatever amounts that may be necessary to reduce the size or length of the transmission line needed to provide the desired increase of insertion loss at radio frequencies. Such a capacitor C1 is added about two thirds of the way down the line, just before the trimming resistors R2. The capacitor C1 is, for example, a .22 microfarad feedthrough capacitor which is located at a point in the line where it is always preceded by sufficient impedance, including skin effect resistance, to prevent the attenuator 28 from ever being tuned out under resonant conditions.

Figures 5, 6:
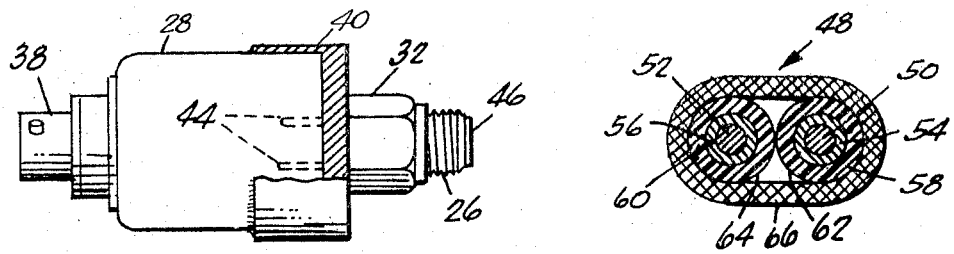
FIGURE 5 is a side view of an illustrative assembly of the radio frequency attenuator with an electroexplosive device.
FIGURE 6 is a cross sectional view of one illustrative embodiment of a lossy transmission line or cable according to my invention.

FIGURE 5 is a view of an illustrative assembly of the attenuator 28 with the electroexplosive device 26. The view is partially broken away to show the shielding of the output end of the attenuator 28 effected by the overlapping end of the electroexplosive device 26. The attenuator 28 has an input connector 38 to which the cable from the switching means 24 (FIGURE 2) is connected. This cable, of course, includes the leads which may act as an antenna. The housing or casing of the electroexplosive device 26 is preferably metallic having a flanged end 40 in which the cylindrical rim slip fits on and overlays the cylindrical output end of the attenuator 28 as shown in FIGURE 5. A 360 degree soft solder joint about the end periphery of the flanged end 40 fastens the electroexplosive device 26 securely to the output end of the attenuator 28.

The bridgewire element or load 32 in the electroexplosive device 26 connects with pins 44 mounted centrally and suitably insulated from the base of the flanged end 40. These pins 44 normally connect with the output end of the lossy transmission line which is the heart of the attenuator 28. A thin, metallic cover plate 46 covers the open end of the electroexplosive device 26 and completes the shielding of the device. When the bridgewire element in the electroexplosive device 26 is energized properly, the primer material about the bridgewire element is ignited to cause initiation of the explosive material contained in the device 26. The explosion blows off the cover plate 46 and ignites a larger explosive or propellant charge that may be contained in a suitable casing (not shown). The threaded end of the electroexplosive device 26 is suitably mounted to the wall of the casing such that the explosion of the electroexplosive device 26 will be communicated to the larger explosive or propellant charge contained within the casing when the cover plate 46 is blown off.

FIGURE 6 is a cross sectional view of one illustrative example of a lossy transmission line according to my invention. The cross sectional view of a twin axial, shielded line or cable 48 is shown. Two parallel conductors 50 and 52 are made of a good conductor such as copper, and the conductors 50 and 52 have respective plated layers 54 and 56 of a high permeability material such as pure iron. The plated layers 54 and 56 are, in turn, covered by respective layers 58 and 60 of a dielectric material such as glass. The layers 58 and 60 of dielectric material may preferably be of woven glass to provide suitable flexibility of the resulting leads 62 and 64.

The two leads 62 and 64 are encased or housed within a metal sheath 66 which shields the leads 62 and 64, and forms a line or cable 48 therefrom. The sheath 66 may be made of copper, for example. The sheath 66 may also be made flexible, and formed by weaving tin plated copper strands over the two leads 62 and 64. Such a flexible sheath 66 may be additionally dipped in molten solder in order to increase its shielding effectiveness while retaining a considerable degree of flexibility. It should be noted that while the layers 54 and 56 are preferably plated layers of pure iron, they may be made of other high permeability material including a plastic material coating which is well mixed with fine ferrite or iron particles.

Direct current flows readily in the copper conductors 50 and 52 whereas high frequency alternating currents flow largely in the iron plating layers 54 and 56 of high permeability due to skin effect. From Eq. 5 above it, it can be easily seen that the alternating current resistance $R_{AC}$ will be increased considerably, and will be much greater than the direct current resistance of the central conductors 50 and 52, of course. The high permeability layers 54 and 56 also increases the distributed lead inductance to the high frequency currents and incur greater magnetic hysteresis and eddy current losses. Proximity effects of the leads 62 and 64, and the shielding (sheath 66) will, of course, further increase the attenuation of radio frequency currents by the transmission line or cable 48.

In order to maximize attenuation, the leads 62 and 64 in the line or cable 48 should be as close together as possible, and the adjacent areas between the two leads should be maximized insofar as skin effects are not adversely affected. Further, consistent with the usual requirements of desirable dielectric insulating properties, the dielectric between leads is chosen so that besides maximizing distributed line capacitance, dielectric hysteresis losses are maximized at the lowest frequency of desired protection of the electro-explosive device 26. It is well known, of course, that most of the loss in a capacitor occurs in the dielectric, and that the power factor represents the fraction of input volt-amperes that is dissipated in the capacitor. Thus, for the illustrative frequency range of 500 kc./s. to 10,000 mc./s., the dielectric layer 58 is selected of such material as to have the highest possible power factor at 500 kc./s.

The plated layers 54 and 56 preferably have a higher resistivity than that of the central conductors 50 and 52, so that the skin effect at the higher frequencies results in greater resistance to the high frequency currents. However, eddy current losses in the plated layers 54 and 56 can contribute significantly to increased attenuation at the higher frequencies. In order to take advantage of these eddy current losses, the plated layers 54 and 56 should have a minimum resistance, consistent with that obtainable in a high permeability material. In this respect, the layers 54 and 56 are plated layers rather than clad since a higher magnetic permeability can be presently obtained with plated layers than clad layers.

The dielectric layers 58 and 60 are selected of material which provides the greatest dielectric hysteresis losses, as mentioned previously. Energy can also be lost through the conductance between the two leads 62 and 64. There is, of course, a certain maximum conductance that is desirable for attenuation and which is the most that can be used without introducing excessive shunting of direct current. Such an optimum dielectric has a significantly lower resistivity than the usual dielectrics in their ordinary use in electrical components and equipment. The use of a relatively high conductance dielectric is permissible for the woven dielectric layers 58 and 60.

The leads 62 and 64 can be made of solid alloy conductors which are respectively covered with a dielectric layer instead of conductors of one material coated with a layer of high permeability material, and then respectively covered with a dielectric layer.. A sheath such as the sheath 66 provided about the dielectric coated, solid alloy conductors produces a line or cable which offers more direct current resistance than the line or cable 48 shown in FIGURE 6 but can be fully adaquate for various uses. The solid alloy conductor preferably used is conetic AA wire made by Perfection Mica, Inc.

The conetic AA wire has a higher magnetic permeability than any clad material that could be presently used to clad the central conductors 50 and 52. Of course, the use of solid alloy conductors without any clad layer or plated layer of high permeability material would considerably reduce the cost of the transmission line or cable 48. An attenuator having 40 decibels insertion loss at 100 kc./s. can be made from about, for example, 10 feet of transmission line using conetic AA wire leads without the need for any additional capacitance as provided by the capacitor C1 (FIGURE 4).

Figure 7:
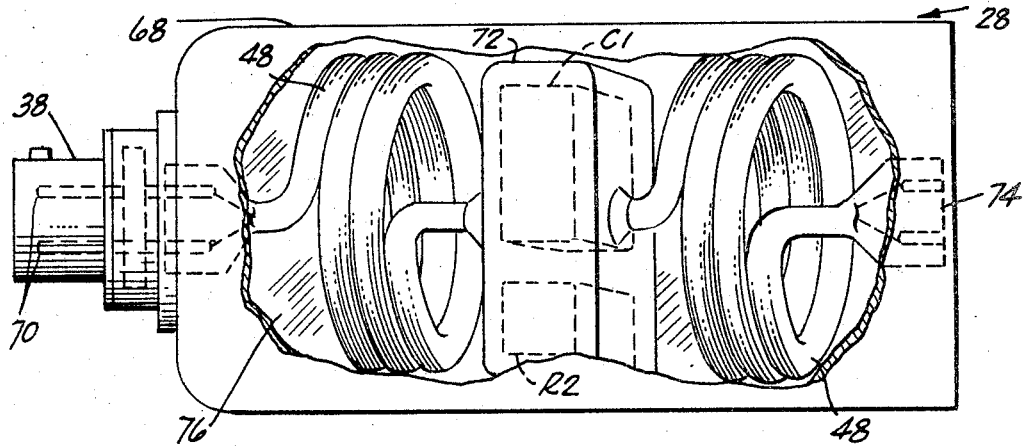
FIGURE 7 is a perspective view of the attenuator shown in FIGURE 5 wherein the casing is partially broken away to reveal the internal arrangement of components therein.

FIGURE 7 is a perspective view of one emboidment of the attenuator 28 wherein the casing 68 is broken away to reveal the internal arrangement of components therein. The components shown generally include those indicated in the schematic diagram of the attenuator 28 in FIGURE 4. Of course, the representation of distributed constants in FIGURE 4, is inherently included in the transmission line or cable component of FIGURE 7.

The illustration of FIGURE 7 has been simplified to some extent but is generally accurate for one exemplary embodiment of the attenuator 28. The casing 68 is, for example, 1¾ inches long with a diameter of 1¼ inches, approximately. The input connector would add approximately ⅝ inch to the length of the casing 68. It should be noted, however, that these illustrative dimensions are essentially maximum figures for a 60 decibles attenuator over the frequency range of 500 kc./s. to 10,000 mc./s., and such dimensions can be greatly reduced by use of optimum or better materials and shape or geometry of component structure and arrangement.

The input connector 38 includes plug pins 70 which connect with the respective lead ends of the transmission line or cable 48. The cable 48 is coiled as indicated for conservation of space, and the cable 48 connects with a feedthrough capacitor C1 which, in turn, connects with trimming resistors R2 in a common metallic case 72. The capacitor C1 is located about two-thirds the way down the line or cable 48. The remaining third of the cable 48 is also coiled as shown, and terminates in a receptacle end 74 into which the pins 44 (FIGURE 5) of the electroexplosive device 26 may be plugged.

The entire interior of the casing 68 is filled with potting compound 76 to set all of the components in place. Of course, the trimming resistors R2 are first properly adjusted before potting. It should be noted that when the electroexplosive device 26 is attached to the casing 68 as shown in FIGURE 5, the casing 68 additionally shields the components therein and the only penetration of radio frequency energy would be through the very small ceramic to metal seals around the respective pins 70, and further confinement is provided by the design of the sheath attachment at the input end to the casing 68.

The capacitor C1 and the trimming resistors R2 can be omitted to reduce the size of the attenuator 28. Omission of the capacitor C1 may be done by using a transmission line or cable 48 made of such materials and shape or geometry of the components, that the added capacitance of the capacitor C1 is unnecessary for providing a more favorable difference in insertion loss between direct currents and radio frequency currents. The trimming resistors R2 also can be more readily omitted with a line or cable 48 which has a greater insertion loss since the direct current resistance thereof can be varied with little derogation of the attenuating effectiveness of the cable 48 to radio frequency currents. Of course, the trimming resistors R2 may be deleted simply by greater control in design and manufacture of the cable 48.

Figures 8, 9:
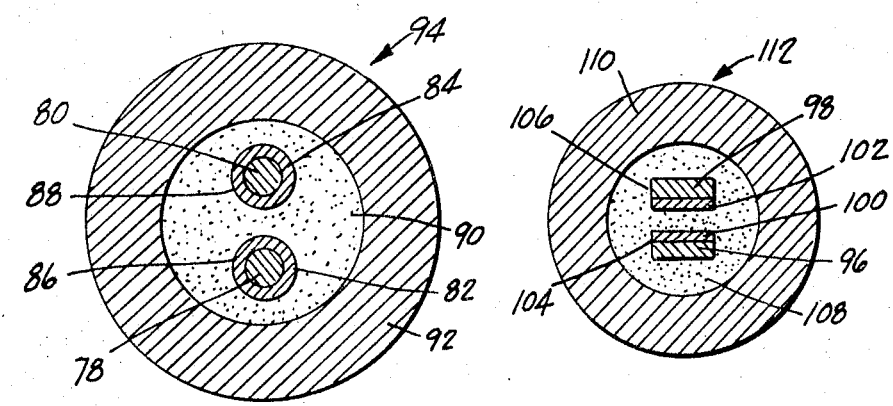
FIGURE 8 is a cross sectional view of another illustrative embodiment of the lossy transmission line or cable.
FIGURE 9 is a cross sectional view of yet another illustrative embodiment of the lossy transmission line or cable.

FIGURE 8 is a cross sectional view of another illustrative embodiment of the lossy transmission line or cable. Central conductors 78 and 80 are made of copper, and are each .0065 inch in diameter, for example. The conductors 78 and 80 have a center to center separation of some .019 inch and are each clad by respective layers 82 and 84 of 50 percent nickel-50 percent iron alloy material. The resultant leads 86 and 88 of central conductors 78 and 80 with their respective clad layers 82 and 84 are each .011 inch in diameter. These leads 86 and 88 are surrounded by dielectric material 90 of magnesium oxide within a sheath 92 made of 50 percent nickel-50 percent iron alloy material. The sheath 92 is, for example, .009 inch thick and the resultant cable 94 has an overall diameter of .063 inch.

It is to be noted that the cable 94 can be, and is, used directly in place of the line or cable 48 shown in FIGURE 7. The cable 48 shown in FIGURE 6 can provide a greater insertion loss than the cable 94 shown in FIGURE 8. Thus, where cable 94 is used as the lossy transmission line in place of cable 48 in the attenuator 28 shown in FIGURE 7, a lumped capacitance as provided by capacitor C1 is more likely desirable than where the cable 48 is used.

Attenuators having approximately the same insertion loss can be made, for example, by either using approximately 13 feet of the cable 94 together with the capacitor C1, or only approximately four feet of the cable 48 without the need of the additional capacitance of capacitor C1. The outer diameter of the cable 48 of FIGURE 6 is about .040 inch as compared to the outer diameter of .063 inch of the cable 94 of FIGURE 8.

FIGURE 9 is a cross sectional view of yet another illustrative embodiment of a lossy transmission line or cable wherein flat leads are utilized to take greater advantage of proximity effects along with skin effects in the leads. Conductors 96 and 98 are made of copper and have adjacent clad or plated strips 100 and 102 which are made of a high permeability material such as 50 percent nickel-50 percent iron alloy. The resultant parallel leads 104 and 106 are embedded as shown in a dielectric material 108 such as magnesium oxide that is contained in sheath 110 of 50 percent nickel-50 percent iron alloy material. Such a transmission line or cable 112 shown in FIGURE 9 is observed to be significantly smaller than the cable 94 which is shown in proportional size relative thereto.

The flat leads 104 and 106 in the design of FIGURE 9 permits utilization of space better with regard to area of dielectric needed for a given area of a lead, and results in greatly increased capacitance between leads, with more pronounced skin effect both from the rectangular cross section of the leads 104 and 106, and increased proximity effects due to the close positioning of large surface areas permissible between leads of such geometrical cross sectional shape. The current density is greatest at the edges which, however, are relatively small in area, and is quite considerable at the flat surfaces due to skin effect. Thus, proximity effects can be very effective with such high density currents in the large, flat adjacent areas. The dielectric material 108 additionally can include a ferrite material which is chosen to provide maximum magnetic hysteresis losses at the lowest frequency that protection is desired.

Figure 10:
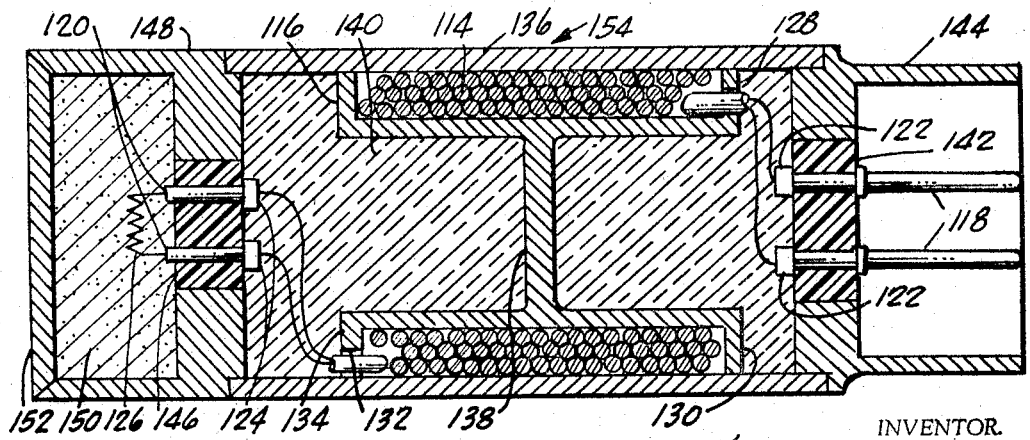
FIGURE 10 is a sectional view of an attenuator and electroexplosive device combination wherein the lossy transmission line or cable and the bridgewire element of the electroexplosive device are fully shielded from external electromagnetic fields.

FIGURE 10 is a sectional view of an attenuator and electroexplosive device combination wherein the container forms a complete radio energy shield for the lossy transmission line or cable utilized. Of course, the different cables 48, 94 and 112 described above are actually shielded by their outer metallic sheaths. However, if the sheaths are woven, as the sheath 66 in FIGURE 6, or the sheaths may not be sufficiently thick, there may be some undesirable penetration by strong radio frequency fields which would be prevented by a suitable container. Further, it may be as difficult and expensive to provide proper shielding of the input and output ends of the lossy transmission line as it would be to pack and enclose the entire line in a small container.

A small coil 114 of a transmission line similar to cable 48 shown in FIGURE 6, is wrapped on a bobbin form 116 which for shielding purpose is preferably metallic, and is attached on one end to terminations 118 and on the other end to terminations 120. The view of FIGURE 10 has been simplified to some extent for clarity of illustration. The transmission line or cable leads at the input end are actually connected to terminal receptacles 122 to which the input terminals 118 are attached. Similarly, the cable leads at the output end are actually connected to terminal receptacles 124 to which terminals 120 of the bridgewire element 126 are attached.

As can be seen in FIGURE 10, the input end of the transmission line coil 114 extends out of the metallic bobbin 116 through a very small hole 128 in the right end flange 130 thereof. Similarly, the output end of the transmission line coil 114 extends out of the metallic bobbin 116 through a very small hole 132 in the left end flange 134 thereof. The bobbin 116 is positioned within a tubular, metallic casing 136, and the space on both sides of the separating wall 138 of the bobbin 116 within the tubular casing 136 are filled with potting compound 140 which sets the parts in place, including the input and output receptacles 122 and 124, as shown.

The input terminals 118 are conventionally affixed to an insulator disc 142 which is mounted in the usual connector shell 144 that is suitably attached to the right end of the tubular casing 136. The output or bridgewire element terminals 120 are similarly affixed to an insulator disc 146 that is mounted to the right end of housing 148 containing an explosive charge 150 in which the bridgewire element 126 is positioned. A cover plate 152 corresponding to the plate 46 in FIGURE 5 is attached to the open end of the housing 148, and the housing 148 is suitably attached to the left end of the tubular casing 136 as shown in FIGURE 10.

The completed assembly 154 is, for example, about 1¾ inches long and ⅝ inch in diameter. Of the 1¾ inches of length, about one inch is that of the attenuator section and about ¾ inch is that of the electroexplosive section. It is noted that the assembly 154 is fully shielded by metallic walls from the input end of the transmission line coil 114 at the very small hole 128 in the right flange 130 of the bobbin 116 to and including the bridgewire element 126.

A continuous shield is provided from the periphery of the sheath (66 in FIGURE 6) of the transmission line at the input end of the coil 114 outside of the hole 128 so that the only penetration possible by electromagnetic waves into the container or assembly 154, other than conducted through the transmission line leads, is through the interior of the sheath 66 or more precisely, through the dielectric layers 58 and 60 and the empty space within the sheath. This penetration is, of course, purely academic since in practice electromagnetic waves could not even reach the end opening of the sheath 66 because of the various intervening metallic structures involved.

Figure 11:
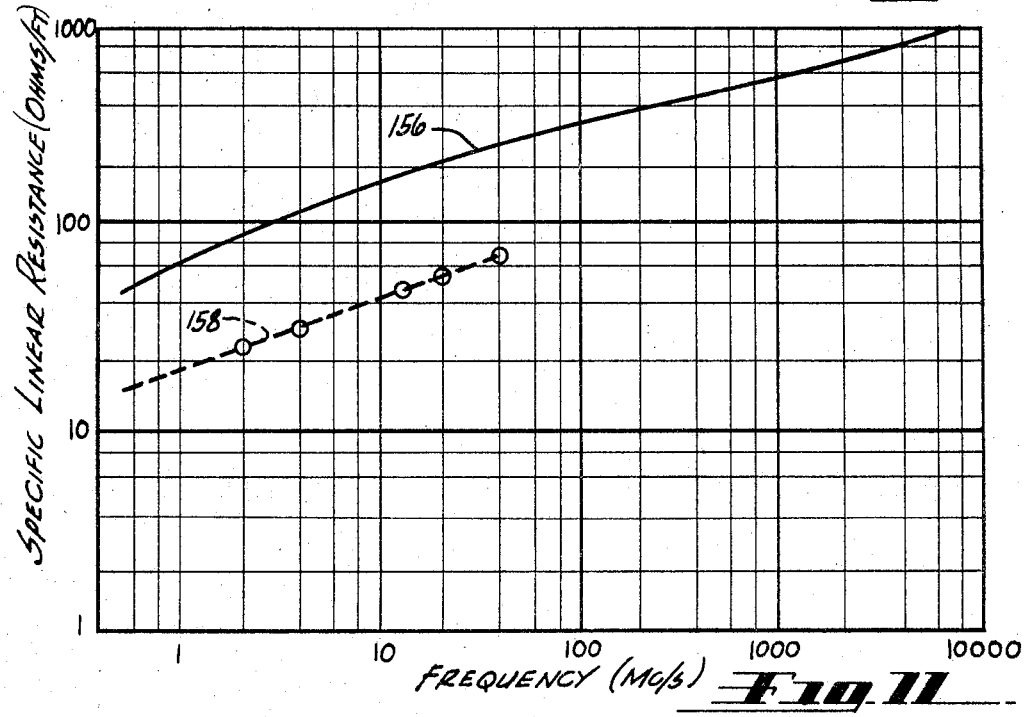
FIGURE 11 is a graph showing a plot of the variation of specific linear resistance of the lossy transmission line or cable shown in FIGURE 8 against frequency.

FIGURE 11 is a graph showing a plot of variation of the specific linear resistance of the transmission line or cable 94 of FIGURE 8 against frequency. The cable 94 is representative of conservative characteristics of the other lines or cables shown and described herein. The solid line curve 156 illustrates the theoretical variation of specific linear resistance versus frequency, and the dash line curve 158 is based on actual measurements. Tests reveal that the transmission line 94 has a direct current resistance $R_{DC}$ of .333 ohm per loop-foot and a capacitance C of 70 pf. per foot. From curve 158 of FIGURE 11, it can be seen that the specific linear resistance $R_S$ at 500 kc./s. is 11 ohms per loop-foot.

Other characteristics of the transmission line 94 include inductance L at 500 kc./s. of 4 microhenries per loop-foot, transmission line attenuation at 500 kc./s. of .37 db per foot, and transmission line attenuation at 10 mc./s. of 3.5 db per foot. At about 20 mc./s., thirteen feet of the cable 94 alone, as used in the attenuator 28 shown in FIGURES 4 and 7 (in place of cable 48), provide 60 decibels loss at frequencies of 20 mc./s. and higher. This protection is available for these higher frequencies regardless of the impedance 36 (FIGURE 4) of the antenna source 30, which impedance 36 includes the radiation resistance of the equivalent antenna circuit.

It is known from previous studies that the antenna source resistance, including the radiation resistance, of the equivalent antenna circuit for many systems such as indicated in FIGURES 1 and 2 could never be greater than 2 ohms at frequencies lower than 100 mc./s. Since any source resistance less than this 2 ohms would result in a greater attenuator 28 resistance relative to the combined resistances of the antenna source 30 and the load 32, as may be seen in FIGURE 4, a greater insertion loss is produced with the normal source resistance which is generally less than 2 ohms. Test generators having a source resistance of 2 ohms were used to test the insertion loss of the attenuator 28 connected to a 2 ohm (bridgewire element) load 32 as shown in FIGURE 4.

Figure 12:
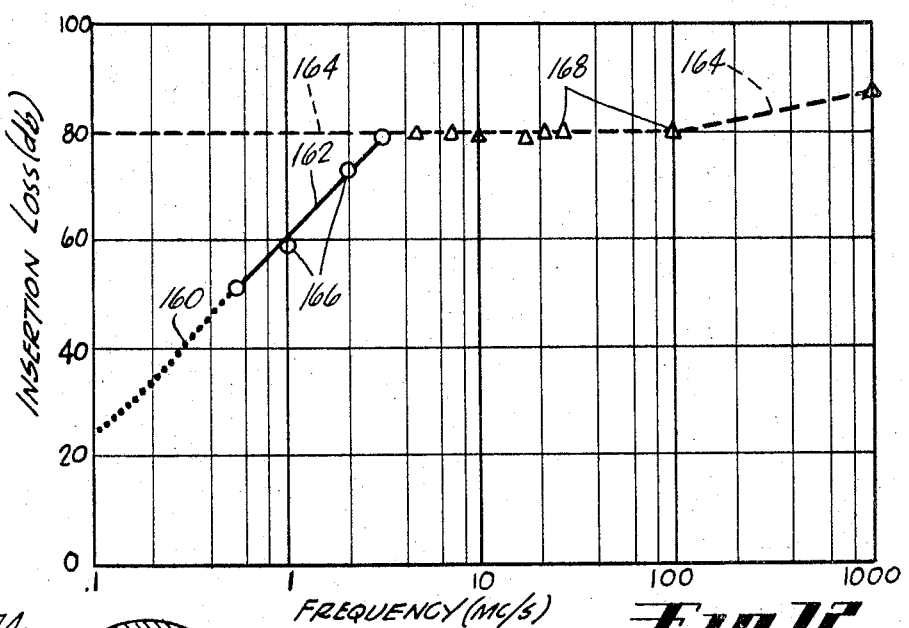
FIGURE 12 is a graph showing a plot of insertion loss versus frequency for an attenuator connected as illustrated in FIGURE 4.

FIGURE 12 is a graph illustrating a plot of insertion loss versus frequency for the attenuator 28 connected to a 2 ohm load and energized by a test generator having a 2 ohm source resistance. The results were obtained for an attenuator 28 having a circuit as shown in FIGURE 4 and a structure as shown in FIGURE 7, except that the lossy transmission line or cable 94 was used instead of the line or cable 48 indicated in FIGURE 7. The dotted line portion 160 in FIGURE 12 is a plot of undefined points and the solid line portion 162 is a plot of specific measured points up to the limit of response of the measuring equipment used to measure the insertion loss of the attenuator 28. The dash line curve 164 indicates the response limits of the measuring equipment.

The specific measured points on the solid line portion 162 are enclosed by small circles 166, and those specific measured points at which the insertion loss of the attenuator 28 exceeded the response limits of the measuring equipment are enclosed by small triangles 168. The insertion loss always exceeds 50 decibels above 500 kc./s. and is greater than 60 decibels for all frequencies above 1 mc./s. The 50 decibels insertion loss at 500 kc./s. is acceptable at this extreme of the frequency span since there is a liberal pad or margin of safety in the requirement of 60 decibels. It is apparent from FIGURE 12 that the actual insertion loss exceeds the response limits of the measuring equipment at all frequencies greater than 3 mc./s. Additional sweep frequency testing confirms the continuity of protection at all frequencies.

Figure 13:
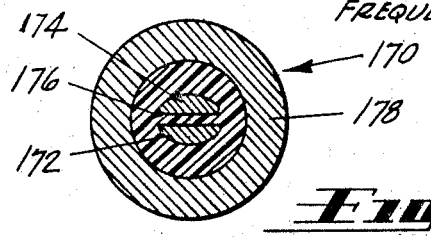
FIGURE 13 is a cross sectional view of another embodiment of a lossy transmission line or cable constructed according to my invention.

FIGURE 13 is a cross sectional view of another embodiment of a lossy tansmission line or cable 170. Segment shaped conductors or leads 172 and 174 are positioned with their chord sides closely adjacent and parallel to each other in a suitable dielectric material 176. The dielectric material 176 is surrounded by sheath 178. As in the other embodiments of a lossy transmission line or cable, the conductors or leads 172 and 174 can be solidly made of a high permeability material which can be an alloy. Alternatively, the segment shaped leads 172 and 174 can be similar to the leads 104 and 106 of FIGURE 9 wherein a high permeability layer of material is located on each of the flat, chord surfaces of each of two ordinary conductors. The dielectric material can be a suitable plastic material of an appropriate conductance or it can be similar to the magnesium oxide of FIGURE 8, or a dielectric including a ferrite material as in FIGURE 9. The sheath 178 is, of course, made of metallic shielding material.

By having segment shaped leads 172 and 174 of the highest magnetic permeability possible embedded in a suitable dielectric within the sheath 178 as shown in FIGURE 13, maximum increasing insertion loss with increasing frequency is obtained. It will be apparent that, due to the shape of the leads 172 and 174, skin and proximity effects are greatly enhanced. At the higher frequencies, skin effect causes the alternating currents to congregate to the peripheries of the two leads 172 and 174 where the resistance is, of course, much greater. Since the periphery of each of the segment shaped leads 172 and 174 is a maximum for its cross sectional area, and a broad flat surface is provided closely adjacent to another broad flat surface, proximity effects between the two leads are also extremely effective.

At the same time, the curved outer surfaces of the leads 172 and 174 are parallel and uniformly close to the inner, cylindrical surface of the sheath 178. Thus, the high skin effect currents at the curved outer surfaces of the leads 172 and 174 produce additional losses in the sheath 178 in the form of eddy currents induced therein. Of course, there are also significant losses in the dielectric 176 which is selected to be of a certain maximum conductance consistent with good and necessary insulating properties for the capacitance formed between the closely adjacent surfaces of the leads 172 and 174. With conductor leads 172 and 174 of the highest magnetic permeability possible, maximum lead inductance and maximum magnetic hysteresis losses are obtained.

In addition to providing radio frequency energy protection, the attenuator can provide static electric protection. In operation, when a static electric source, for example, is discharged into the attenuator 28, energy is dissipated in a ringing action with maximum dissipation occurring in the first portions of the lossy transmission line or cable in the attenuator 28. As is well known, a transmission line can be approximated by a large number of series resistance, inductance and shunting capacitance networks connected in series. The current in the closed loops formed by these series networks alternates at a high frequency after a static electric source is applied to the input, and the energy is absorbed largely in the first network loops and decreases progressively such that only an extremely minute current would be present at the output of the attenuator 28.

A similar action would occur with radio frequency energy which would be progressively dissipated and diminished down the length of the lossy transmission line or cable so that its output energy is greatly reduced from that at its input. Of course, the lossy line or cable offers essentially fixed and relatively low resistance or insertion loss to direct currents.

The (metallic) sheath of the lossy transmission line or cable is generally a ground connection and/or can serve as a common return lead, especially in filter applications of the lossy line or cable. In this instance, only one of the leads of suitable material and construction need be provided within the sheath. This one lead is preferably located in a suitable dielectric or insulating material generally centrally or concentrically positioned with respect to the sheath.

Although a balanced transmission line or cable has been generally indicated, it is not necessary that both leads within the sheath be fabricated of high permeability material and/or be of appropriate construction and shape. For certain uses or certain desired characteristics, the sheath itself and the dielectric material therein can also be omitted, leaving only two leads of which either or both may be made of appropriate high permeability material and shape. These leads could, of course, be independently insulated as freely separate leads, or be individually insulated and then bonded together in close proximity to maintain a parallel relationship between the individually insulated leads.

Further, it can be seen from the different embodiments of the lossy transmission line or cable that the cross sectional shape of the leads materially affects its insertion loss or resistance with increasing frequency. By suitably designing the shape of the leads, as in FIGURE 13, such that the currents due to skin effect are located in appropriate (small) areas of the leads, the alternating current resistance is greatly increased. The distribution of currents due to skin effect is such that the parts of the cross section of a lead which are enclosed by the greatest number of flux lines will carry the least current. At the same time, proximity effects may be utilized to advantage between leads to further increase the effective alternating current resistance.

Accordingly, for specialized applications, the leads in any of the various versions of the lossy transmission line or cable can be suitably shaped without regard to the use of any particular material therefor. For example, one or both leads in a transmission line which may include a sheath or not, can have a cross sectional shape wherein the periphery of a lead has a large number of shallow flutes or channels to provide a large number of sharp ridges or cross sectional corners in which current concentration is greatest due to skin effect, and the resistance is highest. If two such longitudinally fluted leads are used, the adjacent ridges can be closely positioned in an almost touching, meshed relationship.

Another version would be an alloy conductor or lead having a screw thread (a spiral or helical ridge) on the surface in which skin effect currents are forced to flow, as in a coil. Of course, such a threaded conductor or lead can have a high permeability outer layer and a central core which is made of a good direct current conducting material such as copper. In this manner, a longer alternating current path and hence higher alternating current resistance is obtained while the direct current path and direct current resistance remain very short and small.

While my invention has been illustratively described as an attenuator for radio frequency currents, it is apparent that it can be easily adapted to serve as a filter means by adjusting the various values of the distributed constants involved with the attenuator, in accordance with desired frequency response characteristics. In this instance, it may be desirable to add (rather than try to eliminate) lumped constants of capacitance, inductance and/or resistance since space considerations are no longer as important as in the usual attenuator device.

Although some specific dimensions and types of material have been given above in the illustrative examples of my invention, it is to be understood that the particular embodiments of the invention described above and shown in the drawings are merely illustrative of and not restrictive on the broad invention, and that various changes in design, structure and arrangement may be made without departing from the spirit and scope of the appended claims.

I claim:
1. In a device of the class described, a transmission line comprising:
    a pair of regular conducting leads for transmitting electrical energy to a load, said leads being positioned axially parallel to each other and fabricated of an at least fairly good electrically conducting, high permeability magnetic material that provides primarily large skin effect losses at higher frequencies, and each of said leads including
        a shaped cross section having at least a flat side wherein such corresponding flat sides of said leads are positioned closely adjacent and parallel to each other whereby proximity effects are greatly enhanced;
    dielectric material completely surrounding said shaped cross section of each of said leads and maintaining said leads in position relative to each other; and
    a sheath enclosing said dielectric material and positioned generally parallel to and spaced from the outer surfaces of said leads.

2. In a device of the class described, a transmission line comprising:
    a pair of conducting leads positioned axially parallel to each other, said leads being fabricated of an at least fairly good electrically conducting, high permeability magnetic material that provides primarily large skin effect losses at higher frequencies and each of said leads including
        a segment shaped cross section wherein the inner chord sides of said leads are positioned closely adjacent and parallel to each other whereby skin and proximity effects are greatly enhanced and capacitance between said leads is greatly increased;
    dielectric material surrounding each of said leads and maintaining the same in position relative to each other; and
    a sheath having an inner cylindrical surface enclosing said dielectric material and positioned generally parallel and uniformly close to the outer surfaces of said leads.

3. Apparatus as defined in claim 2 wherein said dielectric material includes plastic of a predetermined conductance.

4. Apparatus as defined in claim 2 wherein said dielectric material includes a ferrite material.

5. In a device of the class described, a transmission line comprising:
    a pair of conducting leads positioned axially parallel to each other, said leads each including a shaped cross section having at least a flat side wherein such corresponding flat sides of said leads are positioned closely adjacent and parallel to each other whereby proximity effects are greatly enhanced;
    dielectric material surrounding each of said leads and maintaining the same in position relative to each other; and
    a sheath enclosing said dielectric material and positioned generally parallel to said leads, said cross section of each of said leads being rectangular and having a strip of high permeability material provided on said corresponding flat sides which are positioned closely adjacent and parallel to each other whereby skin and proximity effects are greatly enhanced and capacitance between said leads is greatly increased, and said dielectric material includes a ferrite material.

6. A radio frequency energy attenuator comprising:
    a transmission line including
        a pair of conducting leads positioned axially parallel to each other, said leads each having an inner core section which is made of a good electrically conducting material and an outer layer section which is made of a high permeability material,
        dielectric material provided about each of said leads to separate the same from each other, and a sheath surrounding said dielectric material and leads to form a unitary cable;

a shielding container for containing and enclosing said transmission line therein, said container being adapted to connect one end of said transmission line to electrical power leads and to connect the other end to an electrically responsive device; and a feedthrough capacitor connected in said transmission line and located about two-thirds the length thereof from said end adapted to connect with said power leads.

References Cited

UNITED STATES PATENTS

| | | | |
|---|---|---|---|
| 2,238,915 | 4/1941 | Peters | 333—79 |
| 3,023,383 | 2/1962 | Schlicke | 333—79 |
| 3,035,237 | 5/1962 | Schlicke | 333—79 |
| 3,076,947 | 2/1962 | Davidson | 333—79 |
| 3,125,733 | 3/1964 | Holmbeck | 333—79 |
| 3,191,132 | 6/1965 | Mayer | 333—79 |
| 3,227,974 | 1/1966 | Gray | 333—79 |
| 3,309,633 | 3/1967 | Mayer | 333—79 |
| 863,247 | 8/1907 | Yeatman. | |

OTHER REFERENCES

IBM Tech. Disclosure Bulletin, vol. 5, No. 2, p. 29, July 1962, Rymaszewski et al.: D.C. Power Distribution System.

HERMAN KARL SAALBACH, *Primary Examiner.*

C. BARAFF, *Assistant Examiner.*

U.S. Cl. X.R.

174—36; 333—73